US00RE42709E

(19) United States
(12) Reissued Patent
Washino et al.

(10) Patent Number: US RE42,709 E
(45) Date of Reissued Patent: Sep. 20, 2011

(54) DUAL COMPRESSION FORMAT DIGITAL VIDEO PRODUCTION SYSTEM

(75) Inventors: Kinya Washino, Little Ferry, NJ (US); Barry Schwab, West Bloomfield, MI (US)

(73) Assignee: Multi-Format, Inc., Little Ferry, NJ (US)

( * ) Notice: This patent is subject to a terminal disclaimer.

(21) Appl. No.: 11/003,579

(22) Filed: Dec. 3, 2004

Related U.S. Patent Documents

Reissue of:
(64) Patent No.: 5,488,433
Issued: Jan. 30, 1996
Appl. No.: 08/396,574
Filed: Mar. 1, 1995

U.S. Applications:
(63) Continuation of application No. 09/900,784, filed on Jul. 6, 2001, now Pat. No. Re. 42,020, which is a continuation of application No. 09/016,777, filed on Jan. 30, 1998, now Pat. No. Re. 37,342, which is a continuation-in-part of application No. 08/298,104, filed on Aug. 30, 1994, now Pat. No. 5,537,157, and a continuation-in-part of application No. 08/050,861, filed on Apr. 21, 1993, now Pat. No. 5,450,140.

(51) Int. Cl.
*H04N 5/76* (2006.01)
(52) U.S. Cl. ..... 348/722; 386/278; 386/281
(58) Field of Classification Search ..... 348/231, 348/232, 233, 722; 386/117, 118, 119, 120, 386/52, 60; 360/14.1; *H04N 5/76*
See application file for complete search history.

(56) References Cited

U.S. PATENT DOCUMENTS 5,164,839 A * 11/1992 Lang ..... 386/54
5,218,672 A * 6/1993 Morgan et al. ..... 345/501
5,459,582 A * 10/1995 Takahashi ..... 386/112
5,572,499 A * 11/1996 Kohtani et al. ..... 369/83
5,649,046 A * 7/1997 Stewart et al. ..... 386/52

OTHER PUBLICATIONS

Panasonic NAB 95 Catalog.

* cited by examiner

*Primary Examiner* — M. Lee
(74) *Attorney, Agent, or Firm* — Gifford, Krass, Sprinkle, Anderson & Citkowski, P.C.

(57) ABSTRACT

An audio/video production system is implemented on a PC-based platform, preferably utilizing various forms of removable magnetic, optical, or magneto-optical storage media. Specially modified cameras or other sources provide digitally data-compressed audio and video program materials in two formats, a first format having a higher data-compression ratio and intended for use in off-line systems to develop edit decision lists, and a second format having a lower data-compression ratio and intended for use in on-line editing and to produce the final representations of the programs. Off-line editing decisions may thus be developed on a PC using removable storage media, and final representations of the programs may be produced on-line in accordance with stationary-head or rotary-head digital-tape-based formats, such as DAT, 6-mm or 8-mm tapes. In an alternative embodiment, automatic and unattended editing, or extended program playback of more than 40 hours duration of digital video, is available.

18 Claims, 2 Drawing Sheets

DUAL COMPRESSION FORMAT DIGITAL VIDEO PRODUCTION SYSTEM

Matter enclosed in heavy brackets [ ] appears in the original patent but forms no part of this reissue specification; matter printed in italics indicates the additions made by reissue.

REFERENCE TO RELATED APPLICATIONS

*More than one reissue application has been filed for the reissue of patent application Ser. No. 09/900,784. The reissue applications are application Ser. No. 11/003,579, filed Dec. 3, 2004 (the present application), Ser. No. 11/003,580, filed Dec. 3, 2004, Ser. No. 11/003,576, filed Dec. 3, 2004, and Ser. No. 11/003,834, filed Dec. 3, 2004, all of which are continuation reissues of patent application Ser. No. 09/900,784.* This *is a continuation of U.S. patent application Ser. No. 09/900, 784, filed Jul. 6, 2001 now U.S. Pat. No. RE42,020, which is a continuation of U.S. reissue application Ser. No. 09/016, 777, filed Jan. 30, 1998, now U.S. Pat. No. RE37,342, which is a reissue of U.S. Pat. No. 5,488,433, which* is a continuation-in-part of U.S. application Ser. No. 08/298,104, filed Aug. 30, 1994*, now U.S. Pat. No. 5,537,157,* and U.S. application Ser. No. 08/050,861, filed Apr. 21, 1993, now [patented,] U.S. Pat. No. 5,450,140*, the entire contents of all of which are incorporated herein by reference.*

FIELD OF THE INVENTION

This invention relates generally to video recording systems associated with the editing of program materials, and, more particularly, to a system that takes advantage of a PC-based platform for performing non-linear editing functions.

BACKGROUND OF THE INVENTION

Traditional video editing systems are generally divided into two categories: linear and non-linear. Linear editing systems are generally integrated with tape-based program storage, while non-linear editing systems are associated more closely with disk-based storage media, wherein random-access storage more easily may be implemented. The typical linear editing system is implemented with one of the many "broadcast quality" videotape recording formats. The choices for analog recorders include, among others, 1" C-format, Betacam, Betacam-SP, ¾" U-matic, U-matic-SP, S-VHS, and Hi-8. The choices for digital recorders include, among others, D-1, D-2, D-3, D-5, DCT, and Digital Betacam. Each of these recording formats is incompatible with any other format, and all require sophisticated system facilities, including synchronization systems, edit controllers, audio and video switchers and processors, digital video effects (DVE) systems, character generators, and other equipment. This, in turn, requires extensive physical plant facilities for electric power, air conditioning and air filtration, storage space, and maintenance equipment. Furthermore, large operational and maintenance staffs are required to keep the equipment in good working order. However, recording duration capacity for these types of videotape recorders ranges up to three hours or more, making them uniquely valuable for many applications, such as program distribution, archival storage, and as master program sources for mass duplication of videos for the home video market.

In contrast, non-linear systems are based on optical discs, or alternatively, on magnetic or magneto-optical disks.

Because of the relatively high cost of these storage media when long-duration recording periods are required, such systems are relegated to use as off-line editing systems applied to the preparation of edit decision lists (EDLs) for use in edit suites incorporating linear editing systems. However, the rapid random-access features and editing ease are valuable for short programs.

As currently implemented by many manufacturers (such as AVID and videoCube), PC-based hard disk storage is very expensive. If equipped with 10 GB of storage capacity, the system, in practice, is utilized in a two-step process. First, the original unedited program material is digitized at a high data-compression ratio to provide representative pictures for use in an off-line editing environment, whereby the operator may develop an EDL. This EDL then is used to perform the required editing, using program materials that have been digitized and stored at much lower data-compression ratios. Because these two digitizing steps must be performed in real time, this is an expensive, time-consuming process which requires well-trained and expensive operational and engineering personnel.

SUMMARY OF THE INVENTION

It is an object of the invention to integrate the most valuable features of linear and non-linear editing system approaches.

It is another object of the invention to provide capabilities for automatic unattended editing from edit decision lists developed on an off-line editing system.

It is yet another object of the invention to provide a PC-based digital video recorder for applications such as broadcast television playback, video duplication source-master playback, or other related applications.

A further object of the invention is to provide extended playback of 40 hours or more of digital video programming, for cable television or other uses.

The present invention achieves these and other objectives by providing a PC-based audio/video production system which addresses the problem of providing inexpensive alternatives to the large, expensive edit suites currently in common use. Digital program source materials, produced by specially modified cameras or other sources, provide data-compressed audio and video program materials in two formats having matched edit-time-code identification. A first format having a higher data-compression ratio and intended for use in an off-line editing system is used to develop an edit decision list, and a second format having a lower data-compression ratio is used in an on-line editing system for the production of a final representation of the program. As such, off-line editing decisions may be developed on a PC, including a portable PC, using removable storage media, and final representations of the programs may be implemented on a stationary-head or rotary-head digital-tape-based format, such as DAT, 6-mm or 8-mm.

By employing one of several new, small, inexpensive storage media such as PCMCIA-based disk drives, and by utilizing data-compression technology, the off-line editing capabilities are achieved in an economical system, with the digital-tape-based formats providing broadcast-quality required even for demanding applications. Recording duration capacity for these media is 60 to 120 minutes or longer for conventional NTSC or PAL video formats, and a natural extension to HDTV formats (with comparable program duration capacity) is achieved as commercial availability of storage media having higher recording densities becomes economically practical. Where compatibility to film materials is desirable, operation of the various system components at 24 frames-per-second is implemented.

A method of producing a final video program according to the invention therefore includes the steps of providing program source materials in first and second digital formats, the first format being characterized in having a higher data compression ratio than the second; recording the materials in the first and second formats, respectively, onto first and second removable storage media along with correlated edit-time-code information in each case; interfacing the first storage medium to an off-line video editing system to develop an edit decision list; interfacing the second storage medium to an on-line video editing system; transferring the edit decision list developed in conjunction with the off-line video editing system to the on-line video editing system; and editing the materials in the second format on the second storage medium, in accordance with the edit decision list, to produce a final video program.

DETAILED DESCRIPTION OF THE PREFERRED EMBODIMENT

Figure 1:
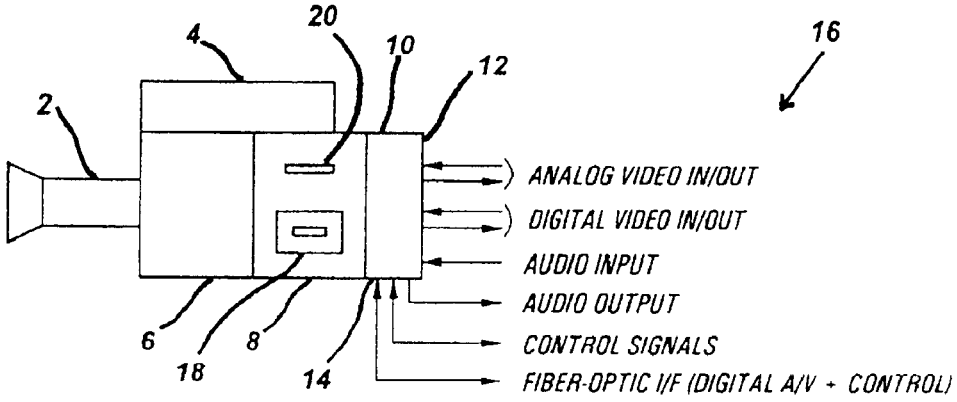
FIG. 1 is a schematic drawing of a portable dual-format digital video recorder optionally implemented as part of a camcorder system.

FIG. 1 shows a portable dual-format digital video recorder according to the invention, optionally implemented as part of a camcorder system. A lens 2 and viewfinder 4 are mounted on the body of a camera frame. The usual optical-splitter, CCD sensors and driver circuitry, and digital signal processing circuitry are located at 6, with optional batterypack capability being shown at 10. The various analog and digital output signals and any input audio, video, or control signals, all shown generally at 16, are interfaced through appropriate connectors disposed on the rear-panel 12 and sub-panel 14. Provisions are included as shown for the input of analog audio signals, and for the output of both analog and digital audio signals. Preferably fiber-optic cabling is employed as a signal-carrying medium.

The internal video recording facilities are comprised of two parts. First, a lower data-compression-ratio digital audio/video signal is recorded on a stationary-head or rotary-head digital data tape recorder (such as quarter-inch cartridge, half-inch cartridge, DAT, 6-mm or 8-mm) in the removable-tape transport 18, intended for utilization in an off-line video editing system, described herein below. Simultaneously, a second digital audio/video signal having a higher data-compression ratio is recorded on a removable storage media unit 20. This removable storage medium is intended for utilization in an off-line video editing system, also described herein below. In practice, this removable storage medium may be implemented by any of several well known technologies, such as magnetic or magneto-optical disks, optical discs, or semiconductor memory modules. The two signal recording media implemented in the two parts of the internal video recording facilities may record the audio and video signals in separated form, or alternatively may be implemented by any of several well-known systems for interleaved audio/video data, such as the audio/video interleave ("AVI") system of Microsoft Corporation, the "M-Power" technique offered by Hewlett-Packard, or other systems.

Examples of removable storage media include PCMCIA-based removable disk drives (currently available with capacities of 420 MBytes, and soon to be available with capacities as high as 1 GByte) and 8-mm. tape cassettes (currently available with capacity of 20 GB, and soon to be available with capacities as high as 80 GB). At a data-compression ratio of 50:1, 420 MBytes will store approximately 75 minutes of program material (in NTSC format using an image dimension in pixels of 320×240 for off-line editing), and at a data-compression ratio of 5:1, 20 GB also will store approximately 60 minutes of program material. When the newer 50 GB or 80 GB tapes become available, these tapes will be capable of storing either four hours of programming in NTSC or PAL format, or two hours in an HDTV format, making them practical for use in those applications currently allocated to linear editing equipment, as described above. Alternatively, using the currently available MPEG-2 data compression with a ratio of 20:1, a 20 GB tape will accommodate four hours of NTSC or PAL recording (or one hour of HDTV); an 80 GB tape will accommodate 16 hours of NTSC or PAL recording (or four hours for HDTV). Where compatibility to film materials is desirable, operation of the various system components at 24 frames-per-second is implemented.

Figure 2:
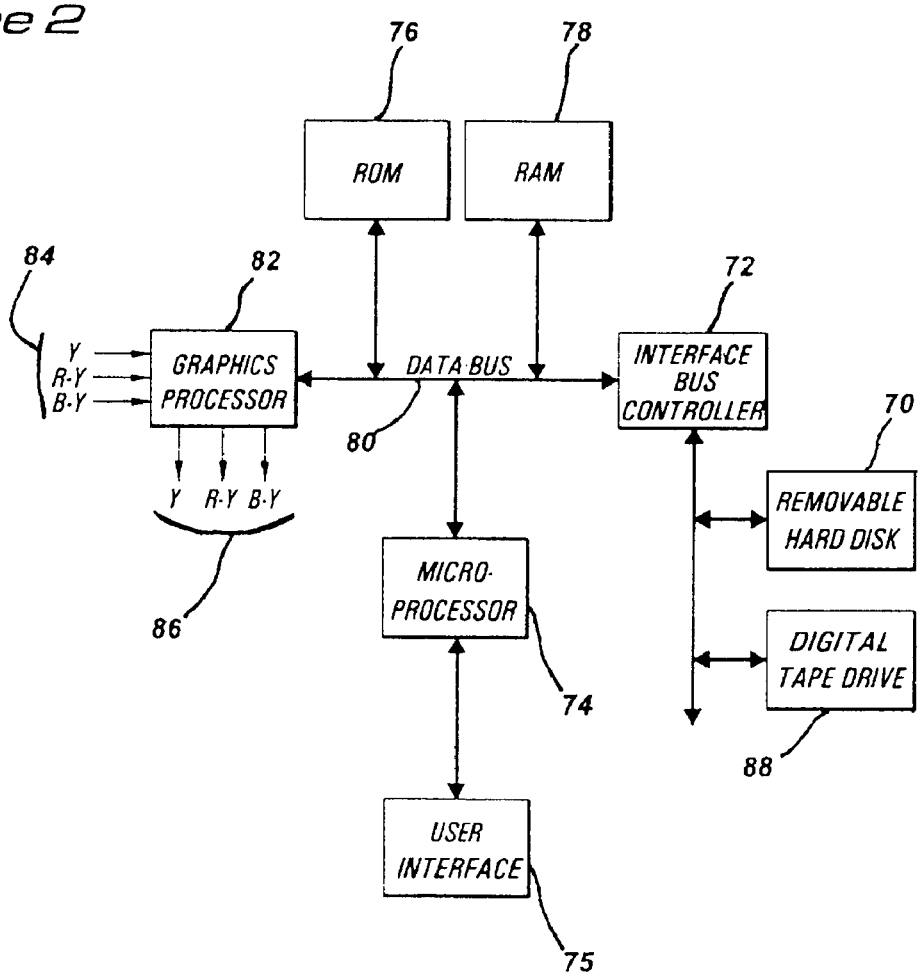
FIG. 2 is a functional block diagram of a dual-format digital video recorder.

FIG. 2 is a functional diagram of a storage-device-based digital recorder according to the invention, either employed in a video camera, or implemented separately in editing and production facilities. As shown, a removable hard disk drive 70 and a digital tape drive 88 are interfaced through an interface bus controller 72. Such a system achieves data transfer rates of 10 MB/sec, and higher rates on these or other data storage devices, such as high-capacity removable memory modules, is anticipated. In practice, alternative methods of storage such as optical or magneto-optical drives could be utilized, preferably based on various interface bus standards such as SCSI-2 or PCMCIA. In all cases, however, in order to ensure compatibility with downstream editing facilities, both of the removable media for drives 70 and 88 should be recorded with identical or at least correlated edit-time-code information, so that edit lists developed from one storage medium will produce the same results when applied to the program material recorded simultaneously on the other storage medium.

Microprocessor 74, through user interface provisions 75 (such as keyboards, touch-screens, etc.) controls the 64-bit or wider data bus 80, which integrates the various components. Currently available microprocessors include the Alpha 21064 by Digital Equipment Corporation, and the MIPS R4400 by MIPS Technologies, Inc. Future implementations might rely on the already announced P6 by Intel Corp. or the PowerPC 620. An alternative architecture may be implemented using multiple processors working in parallel to increase the effective frame rate. The PCI data bus, for example, is capable of sustained data transfer rates of 100 MB/sec. A ROM 76 is used for fixed program storage. The RAM 78 preferably has the capacity to function as a buffer, representing 25 seconds or more of live NTSC video in 4:2:2 format, to enable "hot-swapping" of removable media without interruption of the input video signal during recording or alternatively the output video signal during playback. Graphics processor 82 represents dedicated hardware which performs the various manipulations required to process input video signals 84 and to output the video signals 86. Although shown as Y/R-Y/B-Y format, either the inputs or outputs, or both, may be configured in alternative formats, such as RGB, YIQ, YUV or other commonly used alternatives.

While a software-based implementation of the data compression is possible, a hardware-based implementation is preferred, with the system employing, for the tape-based drives, a data-compression ratio of 5:1 for conventional signals (NTSC/PAL) and a 10:1 data-compression ratio for HDTV signals. For the hard-disk drive, a data-compression ratio of 50:1 is preferably utilized. Examples of the many available options for this data compression function include the currently available Apple QuickTime system, fractal compression, MPEG-1 (for off-line applications) and Motion-JPEG (for on-line applications). In many applications, MPEG-2 data compression will be suitable for on-line editing. Audio signals may be included within the data stream, as proposed in the several systems for digital television transmission already under evaluation by the Federal Communications Commission, or by one of the methods available for integrating audio and video signals used in multi-media recording schemes, such as the Microsoft ".AVI" (Audio/Video Interleave) file format. As an alternative, an independent system for recording audio signals may be implemented, either by employing separate digital recording provisions controlled by the same system and electronics, or by implementing completely separate equipment external to the camera system described above.

Figure 3:
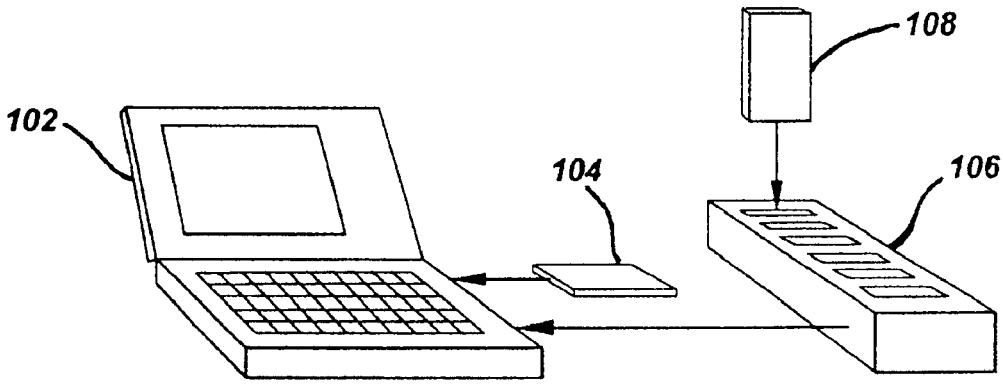
FIG. 3 is an oblique representation of an off-line digital video editing system implemented with a PC-based edit controller having provisions for accepting removable storage media.

FIG. 3 shows an off-line digital video editing system, implemented with a PC-based edit controller having provisions for accepting materials in the form of removable storage media. The controller 102 is preferably of conventional design, but operates at least at the level of current Intel Pentium or high-level "486" processors. The unit is equipped with a color display, and preferably includes a PCI internal bus structure, and provisions for interfacing with a removable PCMCIA storage card 104. In one embodiment this card 104 is implemented with magnetic or magneto-optical disks, or with an optical disc unit. Alternatively, a stand-alone external data storage unit (not shown) could be interfaced through the PCMCIA facilities, or by way of an SCSI-type interface.

As an optional feature, a PCMCIA expansion adapter 106 may be provided, so that a plurality of PCMCIA cards or PCMCIA devices 108 may be accessed conveniently through a single PCMCIA slot on the PC, as shown. This expansion adapter is provided with internal selection and multiplexing circuitry, so that each plug-in card, or device may be accessed independently and without interference with any other card or device in the expansion adapter. The selection may be performed by employing techniques well-known in the art, such as the addressing schemes utilized for SCSI or GPIB data busses. Since a single 420 MByte PCMCIA card module is capable of holding 75 minutes of programming material with image dimensions in pixels of 320×240, 4:2:2 sampling and a 50:1 data compression ratio, an expansion adapter equipped with ten PCMCIA slots and plug-in cards is capable of providing ten hours of original program material, and this programming capacity is capable of being further expanded with other types of PCMCIA-compatible devices. As a further option, a custom-designed PC could be provided with multiple PCMCIA slots to accept a plurality of storage devices without the need for an external expansion adapter.

In operation, the off-line digital video editing system PC is used to edit and combine the materials stored on various data-storage devices, producing an edit decision list which then may be utilized by an on-line editing system. The availability of multiple storage devices enables the operator to rehearse and then confirm "A/B-roll" edits with only two storage devices, and "A/B/C-roll" edits with three storage devices. When equipped with expansion provisions or additional SCSI-bus devices, the system is capable of controlling the various storage devices so as to produce highly complicated sequences in a convenient and timely manner. While the lower-quality (higher data-compression ratio) program materials are utilized only for determining the edit points (edit decision list) for the program, the off-line editing system described herein below is capable of producing the final edited version of the program with high-quality results in accordance with the preferred embodiment.

The versatility of the system may be further enhanced if planning for the program is begun by providing script and staging information to the computer in advance of editing, or even in advance of filming or taping the original production. The script may be provided as a simple text file, or as a formatted word processor file, such as used in "WordPerfect" or "Word for Windows". As an alternative, the file may be of a custom format, as is commonly used by professional scriptwriters. This script and staging information is then reformatted to include specific commands, such as when to switch camera coverage to a particular actor, or the choice of a particular camera angle. Further details may now be included, such as the ability to identify close-up camera coverage, or points at which specific visual special effects (such as split-screen views or chroma-keyed backgrounds) or sound effects are to be incorporated. The modified script file is then used to guide the operator of the off-line editing system in making edit decisions to match the program materials to the script, to make any modifications to the script that are necessitated by the circumstances of the taping, or to take advantage of any unforeseen artistic opportunities presented by the actual taped materials.

In addition, it is common practice in broadcast-television news studios to use remotely controlled cameras to telecast the live programs. These cameras are mounted on motorized bases which are capable of moving the cameras to any desired position on the stage, within the physical limits imposed by the stage itself (such as the length of the camera cables or the clearance available for cameras to move relative to each other on the stage). The zoom-lenses, pan-tilt mounts, and camera electronic control settings are manipulated through the camera remote-control facilities, which may include either separate electronic control panels or alternatively computer interfaces with appropriate control software, such as the unit described by Washino, U.S. Pat. No. 5,325,202. By coupling the software script materials to instructions for control of the camera movements, the capabilities of all of these systems may be optimized. The modified script file must be prepared before the actual taping occurs, however, and should include the physical layout of the sets and props for each scene.

The staging information described herein above, is identified by special camera-remote-control software, and the camera control operator is provided with a graphical interface which depicts the layout of the set and the "blocked" positions of the actors and props for a given scene. This system preferably also includes a user interface (such as a touch-screen or a mouse) to enable the camera control operator to program the cameras to be in the correct location, and to have the correct zoom-lens and pan-tilt positions, to capture the scene as desired, as described in co-pending application U.S. Ser. No. 08/050,861. At this time, the operator optionally may add information to control automated lighting systems, which are well-known in the art of the film, video, and stage production. This enhanced version of the modified script file is then used to direct camera actions during the actual taping of the scenes, and is further modified as part of the off-line editing process as the EDL is developed, as described above, in accordance with the invention.

Figure 4:
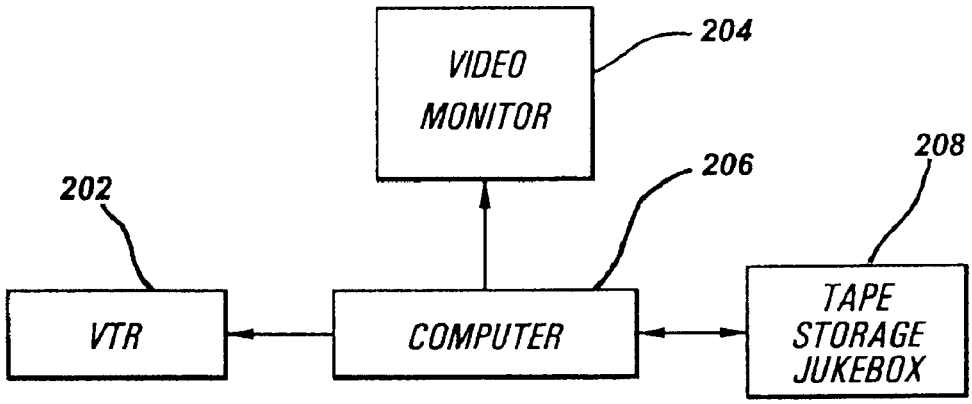
FIG. 4 is a block diagram of an on-line digital video editing system implemented with a PC-based edit controller having provisions for accepting removable storage media.

An on-line digital video editing system is depicted in block-diagram form in FIG. 4. The functional operation of the editing system follows that of the digital video editing system disclosed in FIG. 2, or in an alternative embodiment, may be implemented in a more sophisticated form, as described in our co-pending application "Multi-Format Audio/Video Production System," U.S. application Ser. No. 08/298,104 filed Aug. 30, 1994. This system is implemented with a PC-based edit controller 206 having separate provisions for accepting removable storage media. In the preferred embodiment, the digital video tapes recorded by the system of FIG. 2 are installed in a tape-storage "jukebox" 208 for easy access during editing. Such tape cassette handling devices are well-known in the art of computer data storage, and are generally utilized for data back-up applications or for archival storage.

The edits incorporated into the edit decision list are utilized to sequence the various digital tapes so as to assemble a recording of the desired program materials into a final finished product, which is then recorded on the videotape recorder 202. This video recorder may be implemented as any of the commonly used choices for analog recorders, including, among others, 1" C-format, Betacam, Betacam-SP, U-matic-SP, and Hi-8. If implemented as a digital recorder, the available choices include, among others, D-1, D-2, D-3, D-5, DCT, and Digital Betacam. Furthermore, the final format could be another digital data tape such as the type used for program source material or any other removable storage media. Since the time-code identification numbers on the removable media of the off-line system correlate with those utilized in the on-line system, no conversion or adaptation of the edit decision list is needed. The video monitor 204 is used to manipulate the windows-based edit system control software, and to view the program materials as the edit process proceeds. This process will be essentially automatic, as all of the necessary decisions already have been made in the off-line editing process as described above. In addition, this is an appropriate time for adding digital video effects to the program or to implement any special effects included in the program script.

The invention may be used for other applications limited to record/playback, without implementing the full range of editing features. For example, in applications such as master playback for video duplication, the program master tape must be played, rewound to the beginning, and then restarted, on a repeating cycle. In facilities employing a conventional video tape recorder, this represents a great deal of physical stress on the program master tape, thereby requiring a large number of copies of this master tape when many production runs are required to complete an order. In addition, some production time is lost due to the rewinding process itself. In a disk-based application of the system disclosed herein, there is no significant deterioration of the master program even in repeated usage, and it is possible to begin playing a program at any point desired, with essentially no delay due no cueing the program media to the physical location containing that part of the recorded program. In order to provide the necessary recording time duration, additional hard-disk drives would be added to achieve the required playback duration. Based on an MPEG-2 data-compression ratio of 20:1 (with a 4:2:2 recording system for NTSC signals), two hours of digital video would require approximately 8 GB of disk storage capacity. Disk-drives offering capacity of 9 GB are currently available, and until removable media achieve comparable levels, a program would accordingly be loaded into internal or external disk-storage units from the required number of removable media units.

The invention may also be employed as a playback unit for cable television usage or other extended-playing time applications. By adding as many "juke-box" units as desired, it is a simple matter to extend the playback time capability of the system, with each "juke-box" providing approximately 40 hours of digital video playback. By fully utilizing the RAM-based audio/video buffering capabilities discussed with reference to FIG. 2, it is possible to supply digital video playback on a continuous basis by changing the tape storage cassettes or cartridges "on-the-fly" while video playback proceeds. If provided with computer-readable identification codes on each cassette or cartridge, the computer is able to locate the "juke-box" and the particular physical storage slot containing program materials that previously have be scheduled for playback. Identification and library management systems of this type are well-known in the art, and are in common usage implemented as "cart-machines" employed for playback of commercial advertisements or other program materials at broadcast stations. In addition, playback at any frame rate or television system standard would be available, in accordance with our co-pending U.S. application Ser. No. 08/298,104 filed Aug. 30, 1994.

The versatility of the Digital Video Production System may be enhanced further, if planning for the program is begun by providing script and staging information to the computer in advance of editing, or even in advance of filming or taping the original production. Computer software having access to the script materials will enable the operator to match the scenes to the recorded video materials quickly, thereby speeding the editing process. In addition, it is common practice in broadcast-television news studios to use remotely-controlled cameras to telecast the live programs. By coupling the software script materials to instructions for control of the camera movements, the capabilities of all of these systems will be optimized.

Having thus described the system, we claim:

[1. A digital audio/video production system adapted for use with an on-line video editing facility, the production system comprising:

a digital video recorder capable of simultaneously recording information representative of the same program source material, including correlated edit-time-code information, onto first and second removable storage media in first and second formats, respectively, the information in the first format being data-compressed relative to the information in the second format;

a programmed personal computer configured to receive the first removable storage medium, enabling an operator to edit the information representative of the program source material in the first format in off-line fashion so as to develop an edit decision list; and means to transfer the edit decision list to an on-line video editing facility, the on-line editing facility being further configured to receive the second removable storage medium, whereby an operator of the on-line facility may edit the program source material in the second format using the edit decision list to create a final video production.]

[2. The digital video production system of claim 1, wherein the information in the second format is non-compressed.]

[3. The digital video production system of claim 1, wherein the digital video recorder forms part of a camcorder.]

[4. The digital video production system of claim 1, wherein the first removable medium is a magnetic hard disk.]

[5. The digital video production system of claim 1, wherein the first removable medium is an optical disk.]

[6. The digital video production system of claim 1, wherein the first removable medium is a magneto-optical disk.]

[7. The digital video production system of claim 1, wherein the second removable medium is a tape drive.]

[8. The digital video production system of claim 1, including digital audio and video program data which are interleaved.]

[9. The digital video production system of claim 1, the means to transfer the edit decision list to the on-line video editing facility including means to record the edit decision list onto a third removable storage medium.]

[10. The method of producing a final video program, comprising the steps of:

providing video program source material in first and second digital formats, the material in the first format being compressed relative to the material in the second format;

recording the material in the first and second formats, respectively, onto first and second removable storage media along with correlated edit-time-code information;

interfacing the first storage medium to an off-line video editing system to develop edit decision information;

transferring the edit decision list to an on-line video editing system;

accessing the program material in the second storage medium using the on-line video editing system; and editing the material in the second format on the second storage medium in accordance with the edit decision list to produce a final video program.]

[11. The method of claim 10, the second format being a non-compressed format.]

[12. A digital video production system adapted to deliver program material and an accompanying edit decision list to an on-line video editing facility for the purpose of creating a final program, the system comprising:

digital video recording apparatus, including:

an input to receive a video program, means to digitally compress the program in accordance with more than one compression ratio, an interface to a first removable storage medium, an interface to a second removable storage medium, and means to simultaneously record the video program onto the first removable storage medium at a first compression ratio and onto the second removable storage medium at a second compression ratio, the first compression ratio being greater than the second; and an off-line digital video editing system, including:

an interface to receive the first removable storage medium.

a display to review portions of the video program, enabling a user to make edit decisions concerning the program, and an interface to a third removable storage medium to store a list of the edit decisions, whereby an on-line video editing facility, upon receiving the second and third storage medium, may be used to produce a final, edited version of the program in accordance with the decision list.]

[13. The digital video production system of claim 12, wherein the second compression ratio is zero.]

[14. The digital video production system of claim 12, wherein the off-line digital video editing system forms part of a programmed personal computer.]

[15. The digital video production system of claim 12, wherein the digital video recorder forms part of a camcorder.]

[16. The digital video production system of claim 12, wherein the first removable medium is a magnetic disk drive.]

[17. The digital video production system of claim 12, wherein the first removable medium is an optical disk.]

[18. The digital video production system of claim 12, wherein the first removable medium is a magneto-optical disk.]

[19. The digital video production system of claim 12, wherein the second removable medium is a tape drive.]

[20. The digital video production system of claim 12, including interleaved digital audio and video program data are interleaved.]

[21. The digital video production system of claim 12, wherein the program includes separately recorded audio and video portions.]

[22. A digital video recording apparatus adapted for use with an on-line video editing facility and a personal computer configured to perform off-line editing, including edit-list development, the apparatus comprising:

a camera outputting information representative of a video program;

means to digitally compress the program information at a plurality of compression ratios;

a removable disk drive to store a highly compressed version of the program information suitable for off-line editing using the personal computer; and a removable tape drive to store a less compressed version of the program information suitable for on-line editing;

both versions of the program being stored with correlated edit-time-code information, thereby enabling the on-line editing to use the edit list developed during off-line editing.]

[23. The digital video recording apparatus of claim 22, wherein the camera, means to digitally compress the program at a plurality of compression ratios, removable disk drive, and removable tape drive are all integral to a camcorder.]

[24. A digital audio/video production system, comprising:

(a) digital video recording apparatus, including:

an input to receive a video program, first and second removable digital storage media, and means to simultaneously record the program, including correlated edit-time-code information, onto the first and second removable storage media in first and second formats, respectively, the first format being data-compressed relative to the information in the second format;

(b) a first video editing system, including:

means to receive the first removable storage medium, and controls enabling an operator to edit the program in the first format and develop a set of edit decision directives; and (c) a second video editing system, including:

means to receive the second removable storage medium, means to receive the edit decision directives, and means to edit the program information in the second format in accordance with the edit decision directives to create a final video production.]

[25. The digital audio/video production system of claim 24, wherein the digital video recording apparatus includes means to receive a plurality of the first removable storage media.]

[26. The digital audio/video production system of claim 24, wherein the second video editing system includes means to receive a plurality of the second removable storage media, wherein the edit decision directive being applicable to all of the second removable storage media received.]

[27. The digital audio/video production system of claim 26, wherein the digital video recording apparatus forms part of a camcorder.]

[28. The digital audio/video production system of claim 26, wherein the first video editing system forms part of a programmed personal computer.]

[29. The digital audio/video production system of claim 26, wherein the first removable digital storage medium is a magnetic disk.]

[30. The digital audio/video production system of claim 26, wherein the first removable digital storage medium is an optical disk.]

[31. The digital audio/video production system of claim 26, wherein the first removable digital storage medium is a magneto-optical disk.]

[32. The digital audio/video production system of claim 26, wherein the first removable digital storage medium is a semiconductor memory.]

[33. The digital audio/video production system of claim 24, wherein the second removable digital storage medium is a magnetic tape.]

[34. A video production method, comprising the steps of:

simultaneously recording information representative of a video program, plus correlated edit-time-code information, onto first and second removable digital storage media in first and second formats, respectively, the program information in the first format being data-compressed relative to the program information in the second format;

receiving the first removable storage medium at a first video editing facility and editing the program information at the first facility in the first format to develop a set of edit decision directives based upon the edit-time-code information; and receiving the second removable storage medium and edit decision directives at a second video editing facility and editing the program information at the second facility in the second format in accordance with the edit decision directives so as to create a final video production.]

[35. The video production method of claim 34, further including the step of recording the final video production onto a third removable storage medium at the second video editing facility.]

[36. The video production method of claim 34, further including the step of outputting the final video production as the program information is edited in the second format in accordance with the edit decision directives.]

[37. The video production method of claim 34, wherein the step of editing the program information at the second facility further includes the step of adding audio special effects in the final video production.]

[38. The video production method of claim 34, wherein the step of editing the program information at the second facility further includes the step of adding video special effects in the final video production.]

[39. The video production method of claim 38, wherein the step of adding video special effects includes the step of adding titling.]

*40. A dual format digital video editing system for recording a program having audiovisual content, comprising:*

*a first digital storage medium;*

*a second digital storage medium;*

*a first digital interface associated with the first digital storage medium for receiving a first signal representing the audiovisual content in a first compressed, digital format and edit-time-code information, wherein the audiovisual content in the first compressed, digital format and the edit-time-code information are recorded onto the first digital storage medium;*

*a second interface associated with the second digital storage medium for receiving a second signal representing the audiovisual content in a second compressed, digital format and edit-time-code information, wherein the audiovisual content in the second compressed, digital format and the edit-time-code information are recorded onto the second digital storage medium;*

*wherein the edit-time-code information for the audiovisual content in the first compressed, digital format and the edit-time code for the audiovisual content in the second compressed, digital format are correlated;*

*wherein the audiovisual content in the first compressed, digital format is more compressed than the audiovisual content in the second compressed, digital format;*

*wherein the audiovisual content in the first compressed, digital format is recorded simultaneously with the audiovisual content in the second compressed, digital format;*

*a third interface associated with an off-line digital video editing system to receive the audiovisual content in the first compressed, digital format from the first digital storage medium, wherein the off-line digital video editing system is used to create an edit-decision-list using the audiovisual content in the first compressed, digital format; and*

*a fourth interface associated with an on-line digital video editing system to receive the audiovisual content in the second compressed, digital format from the second digital storage medium, wherein the edit-decision-list is used by the on-line digital video editing system to edit the audiovisual content in the second compressed, digital format.*

*41. The dual format digital video editing system of claim 40, wherein the first digital storage medium is a removable storage medium.*

*42. The dual format digital video editing system of claim 40, wherein the second digital storage medium is a removable storage medium.*

*43. The dual format digital video editing system of claim 40, wherein the audiovisual content in the first and second compressed, digital format comprise a frame rate of substantially 24 frames per second.*

*44. The dual format digital video editing system of claim 40, wherein the first signal representing audiovisual content in a first compressed, digital format and the second signal representing audiovisual content in a second compressed, digital format comprises a video program, and wherein a complete copy of the video program is stored on the first digital storage medium and a complete copy of the program is stored on the second digital storage medium.*

*45. The dual format digital video editing system of claim 40, wherein the first digital storage medium and the second digital storage medium are part of a camcorder.*

*46. The dual format digital video editing system of claim 40, further including random access memory (RAM) for temporarily storing a portion of the audiovisual content in the first compressed, digital format.*

*47. The dual format digital video editing system of claim 46, wherein the first digital storage medium is removable and wherein the first digital storage medium is hot-swappable from the system.*

*48. The dual format digital video editing system of claim 40, further including digital script information, wherein the*

*digital script information is used with the audiovisual content in the first compressed, digital format to create the edit-decision-list.*

*49. A dual format digital video editing method for recording a program having audiovisual content, comprising:*

*providing a first signal representing the audiovisual content in a first compressed, digital format and edit-time-code information;*

*providing a second signal representing audiovisual content in a second compressed, digital format and edit-time-code information, wherein the audiovisual content in the first compressed, digital format is more compressed than the audiovisual content in the second compressed, digital format and wherein the edit-time-code information for the audiovisual content in the first compressed, digital format and the edit-time code for the audiovisual content in the second compressed, digital format are correlated;*

*simultaneously recording the first signal representing the audiovisual content in the first compressed, digital format with its edit-time-code information and the second signal representing the audiovisual content in the second compressed, digital format with its edit-time-code information;*

*transferring the audiovisual content in the first compressed, digital format from the first digital storage medium to an off-line digital video editing system;*

*creating an edit-decision-list using the off-line digital video editing system and the audiovisual content in the first compressed, digital format;*

*transferring the audiovisual content in the second compressed, digital format from the second digital storage medium to an on-line digital video editing system; and*

*editing the audiovisual content in the second compressed, digital format using the on-line digital video editing system and the edit-decision-list.*

*50. The dual format digital video editing method of claim 49, wherein the first signal representing the audiovisual content in the first compressed, digital format with its edit-time-code information is recorded onto a first digital storage medium and wherein the second signal representing the audiovisual content in the second compressed, digital format with its edit-time-code information is recorded onto a second digital storage medium.*

*51. The dual format digital video editing method of claim 50, wherein the first and second digital storage media are removable.*

*52. The dual format digital video editing method of claim 49, wherein the audiovisual content in the first and second compressed, digital format comprise a frame rate of substantially 24 frames per second.*

*53. The dual format digital video editing method of claim 50, wherein the first signal representing audiovisual content in a first compressed, digital format and the second signal representing audiovisual content in a second compressed, digital format comprises a video program, and wherein a complete copy of the video program is stored on the first digital storage medium and a complete copy of the program is stored on the second digital storage medium.*

*54. The dual format digital video editing method of claim 50, wherein the first and second digital storage media are part of a camcorder.*

*55. The dual format digital video editing method of claim 49, further including temporarily storing a portion of the audiovisual content in the first compressed, digital format on random access memory (RAM).*

*56. The dual format digital video editing method of claim 53, wherein the first digital storage medium is removable and further including hot-swapping the first digital storage medium.*

*57. The dual format digital video editing method of claim 49, further including transferring digital script information, wherein the edit-decision-list is created using script information in addition to the audiovisual content in the first compressed, digital format to create the edit-decision-list.*

* * * * *